(12) United States Patent
Higgs

(10) Patent No.: US 7,526,996 B1
(45) Date of Patent: May 5, 2009

(54) EMBOSSING HAND TOOL

(75) Inventor: James R. Higgs, Garden Grove, CA (US)

(73) Assignee: Circle Back, Inc., Garden Grove, CA (US)

( * ) Notice: Subject to any disclaimer, the term of this patent is extended or adjusted under 35 U.S.C. 154(b) by 374 days.

(21) Appl. No.: 11/462,986

(22) Filed: Aug. 7, 2006

(51) Int. Cl.
*B44B 5/02* (2006.01)

(52) U.S. Cl. .................. 101/31; 101/3.1; 101/31.1; 101/18; 101/21

(58) Field of Classification Search ............ 101/3.1, 101/18, 19, 21, 31, 31.1
See application file for complete search history.

(56) References Cited

U.S. PATENT DOCUMENTS

| 168,924 | A |   | 10/1875 | Russell |   |
|---|---|---|---|---|---|
| 188,262 | A |   | 3/1877 | Russell |   |
| 3,626,845 | A | * | 12/1971 | Whitaker | ............ 101/3.1 |
| 3,901,370 | A | * | 8/1975 | Poulton | ............ 400/134.4 |
| 4,272,888 | A |   | 6/1981 | Hartmeister |   |
| 5,660,105 | A | * | 8/1997 | Benson et al. | ............ 101/3.1 |
| 2005/0126407 | A1 | * | 6/2005 | Hixon et al. | ............ 101/31.1 |

* cited by examiner

*Primary Examiner*—Daniel J Colilla
*Assistant Examiner*—David Banh
(74) *Attorney, Agent, or Firm*—Blakely Sokoloff Taylor & Zafman

(57) ABSTRACT

An embossing hand tool includes a first handle that can be operatively supported by a flat surface. The first handle includes a first embossing die and may also include a changeable indicia supported by a heated axle. A second embossing die may include a resilient pad opposite the changeable indicia. A second handle is coupled to the first handle and to the second embossing die with one of the couplings being a pivotal coupling and the other coupling being a sliding coupling. A link is coupled to the first handle and to the second embossing die with one of the couplings being a pivotal coupling and the other coupling being a sliding coupling. The link is further coupled to the second handle at a pivot point equidistant from the other couplings such that the first embossing die and the second embossing die remain substantially parallel throughout their range of motion.

19 Claims, 5 Drawing Sheets

EMBOSSING HAND TOOL

BACKGROUND OF THE INVENTION

Vacuum packaging may be used to store perishables, such as foodstuffs. Storing perishable items in conditions that minimize exposure to oxygen and moisture may slow the degradation of these items during the time they are stored.

Various bags and tubing of plastic sheet material that may be formed into bags may be used for the purpose of vacuum sealing perishables. Tubing may be an extruded seamless tube, a folded sheet with a seam, two sheets joined with two seams, or other structure that provides a tube of plastic sheet material. Unsealed bags may be a length of tubing that is sealed with a seam at one end that is typically regarded as the bottom of the bag.

Commercial bags and tubing may consist of an inner layer of heat sealable thermoplastic and an outer layer of gas impermeable material. Additional layers may be used. The material may be uniform in thickness although each of layers may be of a different thickness than other layers. Such bags and tubing are generally inexpensive. Commercial bags may be troublesome to use. Commercial bags may not be evacuated effectively with home-type vacuum packaging machines that do not produce strong vacuums.

Home-type vacuum packaging machines may require the use of bags where the inner bag surface includes channels such as the bags described in U.S. Pat. No. 4,756,422. The channels in the home-type bags prevent the plastic sheets of the bag from clinging completely to the surface of the item being packaged. This may allow evacuation of the bag with a relatively weak suction. The channels may leave a residual volume that contains oxygen and moisture. Even if the bag is evacuated relatively well, the greater the residual volume, the greater the residual oxygen and moisture that the stored item is exposed to. It is desirable to minimize the residual volume when the bag is sealed. It may be particularly desirable to minimize the residual volume immediately adjacent to the stored item.

It would be desirable if commercial bags having smooth inner surfaces could be used with home-type vacuum packaging machines.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

The present invention provides a tool that may be used by a consumer to emboss a heat sealable plastic bag which is comprised of a heat sealable thermoplastic inner layer and an outer layer of a gas impermeable material. A bag will typically have one inner heat sealable layer and one or more outer layers, each of which will bonded so that no air pockets exist between the layers. The majority of the bag is comprised of flat sheet material having a smooth inner surface that may cling completely to the surface of the item being packaged to minimize the residual volume of a sealed package. The tool may create a novel pattern of embossed air channels on a relatively small area of the bag adjacent and unsealed edge. Providing such an embossed pattern has been found to allow effective evacuation of the bag even with the relatively weak suction typically produced by home-type vacuum sealing devices.

Figure 1:
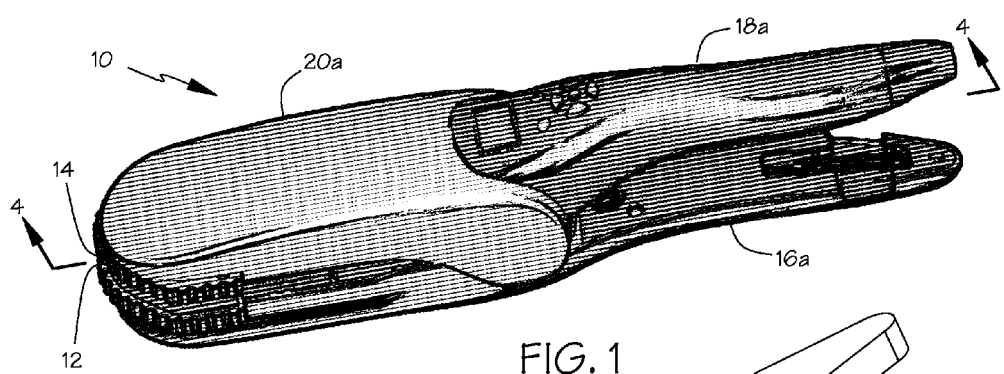
FIG. 1 is a pictorial view of a tool that embodies the invention.

FIG. 1 shows a hand operated tool 10 that embodies the invention. The tool may include a pair of embossing dies 12, 14 for embossing the bag material. A first embossing die 12 may be rigidly connected to a first handle 16a. A second embossing die 14 may be operatively coupled to a second handle 18a. Operating the second handle 18a by moving it toward the first handle 16a may cause the second embossing die 14 to close against the first embossing die 12.

The first handle 16a may provide a base that can be supported by a flat surface when the tool 10 is used to emboss the bag material. This may allow an operator to apply a portion of their body weight to the second handle 18a thus generating relatively high forces for closing the embossing dies 12, 14. The first handle 16a may be shaped so that the user can squeeze the first and second handles 16a, 18 together with one or two hands.

The handles are coupled to the embossing dies in a manner that permits the dies to be closed and press a sheet of material between the dies while maintaining the dies in a parallel relationship. It will be appreciated that pressing material between the dies may tend to thin the material. If the dies are closer together in one area, that area may be thinned to the point where pinholes are formed or the oxygen permeability is otherwise increased unacceptably.

The tool 10 includes four assemblies that move relative to one another—the first embossing die 12, the second embossing die 14, the second handle 18, and a link that will be described below. Each of these assemblies may include one or more parts that are assembled in a fixed relationship so that the assembly functions as a single part. In this description the assemblies may be variously referred to collectively or by individual parts of the assembly. For example, the first embossing die 12 is rigidly coupled to the first handle 16a. Thus the first handle 16a may be used as a reference to the first embossing die assembly of which it is an immovable part.

Figure 2:
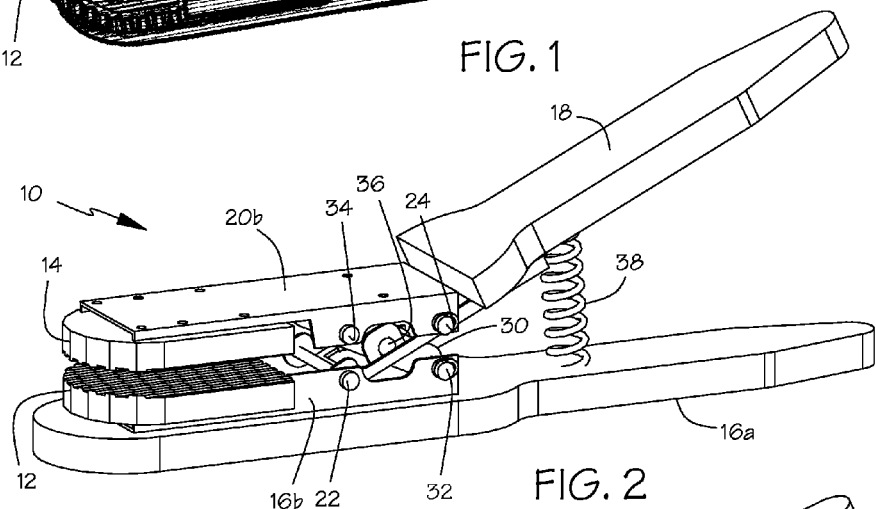
FIG. 2 is a pictorial view of the tool of FIG. 1 with covers removed.

FIG. 2 shows the tool 10 of FIG. 1 with a second embossing die cover 20a removed from the to allow the closing mechanism to be better seen. The first embossing die 14 may include a joint portion 16*b* that provides coupling points. Likewise, the second embossing die 14 may include a joint portion 20*b* that provides coupling points.

The second handle 18 is coupled to the first embossing die 12 by a pivotal coupling 22. Preferably pivotal couplings are provided by pins in closely fitted holes that permit only rotation of the coupled parts. The second handle 18 is further coupled to the second embossing die 14, 20*b* by a sliding coupling 24. Preferably sliding couplings are provided by pins in slots that permit rotation of the coupled parts and translation along the length of the slot.

A link 30 is coupled to the first embossing die 12 by a sliding coupling 32. The link 30 is further coupled to the second embossing die 14, 20*b* by a pivotal coupling 34. The link 30 is still further coupled to the second handle 18 at a pivot point 36.

The four couplings 22, 24, 32, 34 to the embossing dies 12, 14 are arranged so that pairs of couplings on opposite dies maintain a parallel relationship as the tool is closed. This relationship is most conveniently achieved by locating pivot points for the four couplings 20, 22, 24, 26 equidistant from the pivot point 36 between the link 30 and the second handle 18. As a result of this relationship in the coupling of the parts, the first embossing die 12 and the second embossing die 14 remain substantially parallel throughout their range of motion.

A biasing member, such as a coil spring 38, may urge the tool toward an open position in which the first embossing die 12 and the second embossing die 14 are urged toward their maximum separation. It will be appreciated that the biasing member may be of any of a variety of materials, in a variety of configurations, and located to act directly or indirectly to urge the dies into separation.

Figure 3:
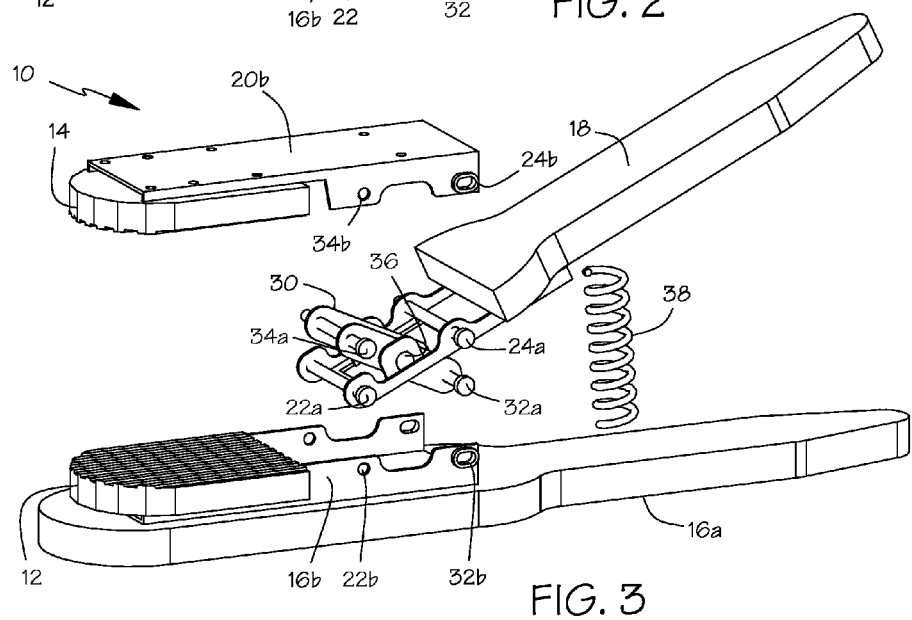
FIG. 3 is an exploded view of the tool of FIG. 1 with the covers removed.

FIG. 3 shows the tool 10 of FIG. 1 in an exploded view to allow certain aspects of the coupling of the parts to be better seen.

Figure 4A:
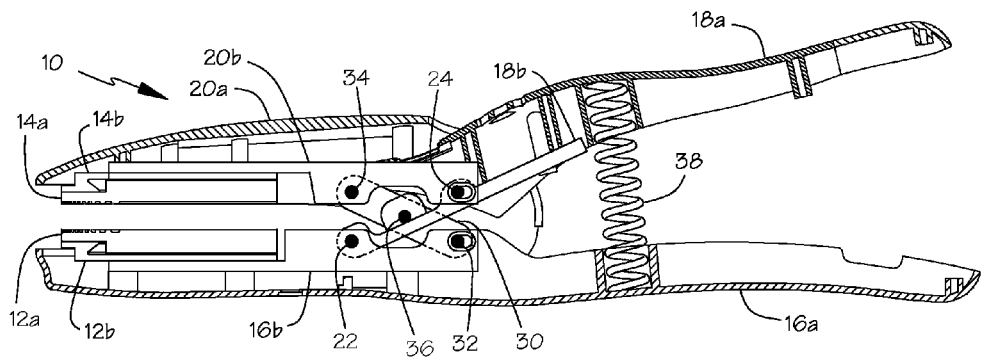
FIGS. 4A and 4B are side views of the tool of FIG. 1 in open and closed positions with the covers drawn in section view along section line 4-4 of FIG. 1 to allow the relationship of the parts to be better seen.
Figure 4B:
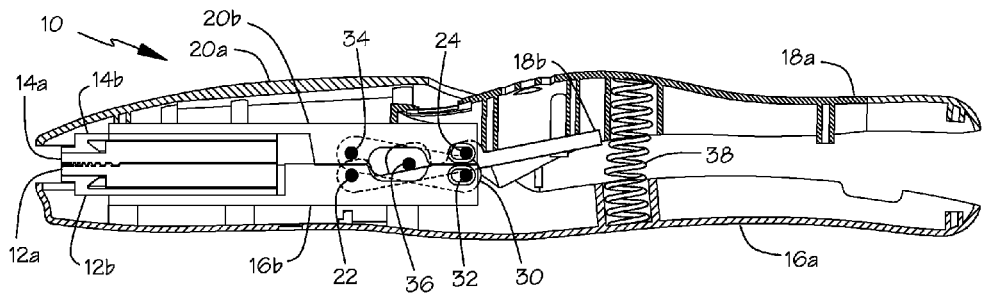

FIGS. 4A and 4B show the tool 10 of FIG. 1 in a side view. The outer portion of the handle 18*a*, the second embossing die cover 20*a*, and a cover portion of the first handle 16*a* have been sectioned along section line 4-4 of FIG. 1 to show the coupling of parts. FIG. 4A shows the tool 10 in a fully open position and FIG. 4B shows the tool in the closed position.

The embossing dies 12, 14 may be of a two piece construction in which the embossing pattern may be on a separate embossing plate 12*a*, 14*a* that is assembled an embossing die carrier 12*b*, 14*b*. The embossing plates 12*a*, 14*a* may be advantageously constructed where the outer surfaces have low thermal conductivity and the embossing plates have high thermal conductivity. This may lessen the likelihood of a user coming in contact with a hot surface if a heating element is included in the embossing dies.

Figure 5A:
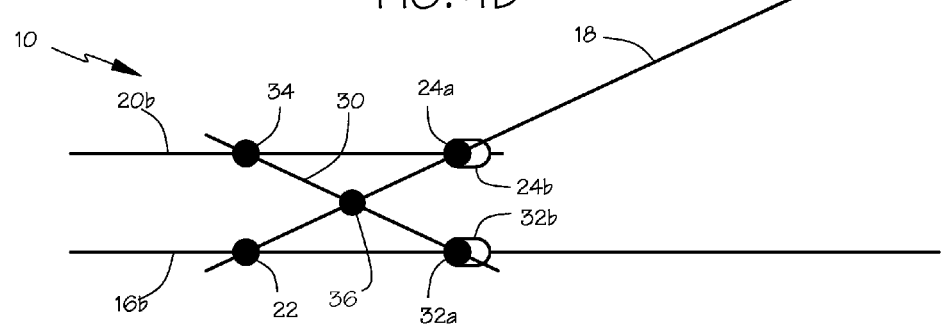
FIGS. 5A and 5B are schematic views of the tool of FIG. 1 in open and closed positions.
Figure 5B:
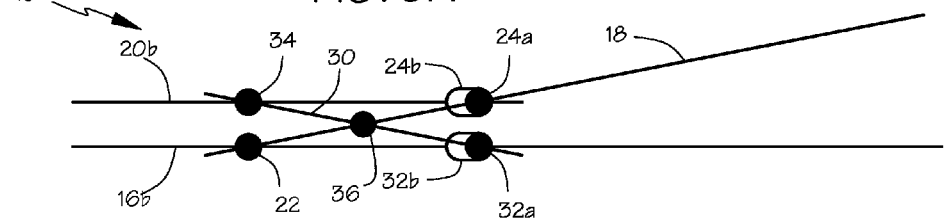

FIGS. 5A and 5B show the tool 10 of FIG. 1 in a schematic drawings that correspond to the views of FIGS. 4A and 4B. The pivotal coupling 22 between the second handle 18 and the first embossing die 16*b* may be in the form of a pin 22*a* in a hole 22*b* (FIG. 3) or any other form of joint that provides a similarly constrained motion. The sliding coupling 24 between the second handle 18 and the second embossing die 20*b* may be in the form of a pin 24*a* in a slot 24*b* (FIG. 3) or any other form of joint that provides a similarly constrained motion.

The sliding coupling 32 between the link 30 and the first embossing die 16*b* may be in the form of a pin 32*a* in a slot 32*b* (FIG. 3) or any other form of joint that provides a similarly constrained motion. The pivotal coupling 34 between the link 30 and the second embossing die 20*b* may be in the form of a pin 34*a* in a hole 34*b* (FIG. 3) or any other form of joint that provides a similarly constrained motion.

The pivotal coupling 36 between the link 30 and the second handle 18 may be in the form of a pin in a hole or any other form of joint that provides a similarly constrained motion. The pivot point 36 may be equidistant from the other coupling points 22, 24, 32, 34. As a result, the first embossing die 12, which is rigidly supported by the first handle 16, and the second embossing die 20*b* remain substantially parallel throughout their range of motion.

It will be appreciated that that the length of the slots 24*b*, 32*b* in the sliding couplings constrains the range of motion of the embossing dies 12, 14. The length of the slots 24*b*, 32*b* may be advantageously chosen to control the maximum separation of the embossing dies 12, 14. It may be desirable to limit the maximum separation of the embossing dies 12, 14 to discourage placing anything other than thin sheet material between the embossing dies.

Figure 6A:
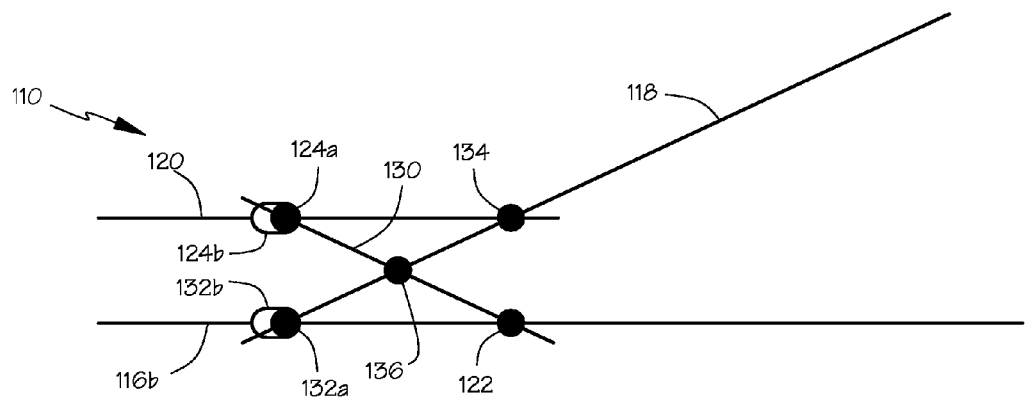
FIGS. 6A and 6B are schematic views of another tool that embodies the invention in open and closed positions.
Figure 6B:
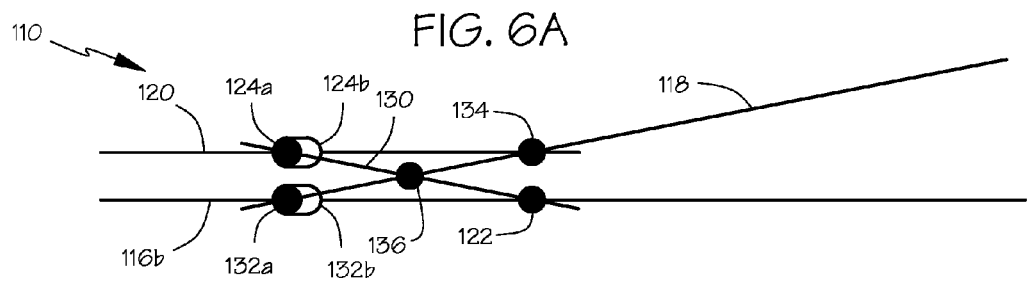

FIGS. 6A and 6B show another embodiment of a tool 110 in which the sliding couplings 124, 132 are interchanged with the pivotal couplings 122, 134 relative to the preceding embodiment. The sliding couplings may be used for either of the two couplings on each of the two embossing dies. Preferably the slot portion 124*b*, 132*b* or its equivalent is on the embossing die portion 116, 120 of the joint. The slot portion or its equivalent may be on the second handle 118 and/or the link 130 but the slot may not be straight. Preferably both slot portions 124*b*, 132*b* or their equivalents are on the same end of the embossing die portion 116, 120 of the joint to prevent relative lateral motion between the embossing dies.

Figure 7A:
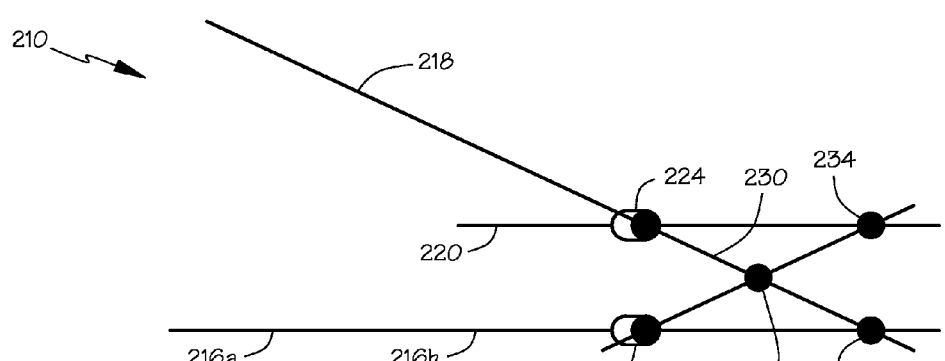
FIGS. 7A and 7B are schematic views of yet another tool that embodies the invention in open and closed positions.
Figure 7B:
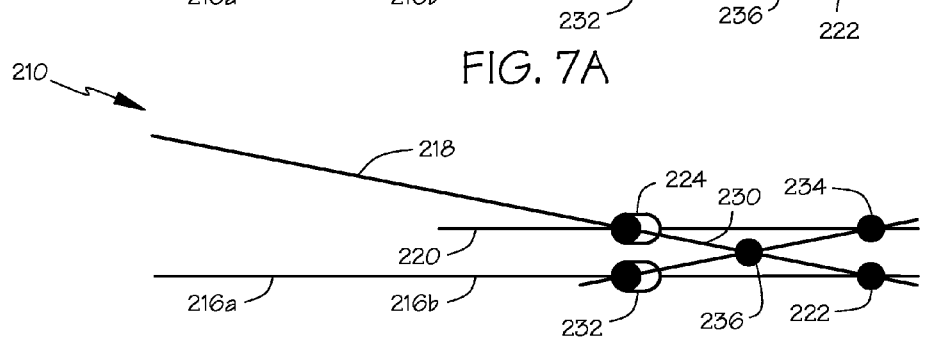

FIGS. 7A and 7B show another embodiment of a tool 210 in which the handle portion 216*a* of the first embossing die 216*b* and the second handle 218 extend to the same side of the coupling points 222, 224, 232, 236 as the embossing dies 216*b*, 220. This may permit the operator to place material between the embossing dies and operate the tool to emboss the material from the same side of the tool.

Figure 8:
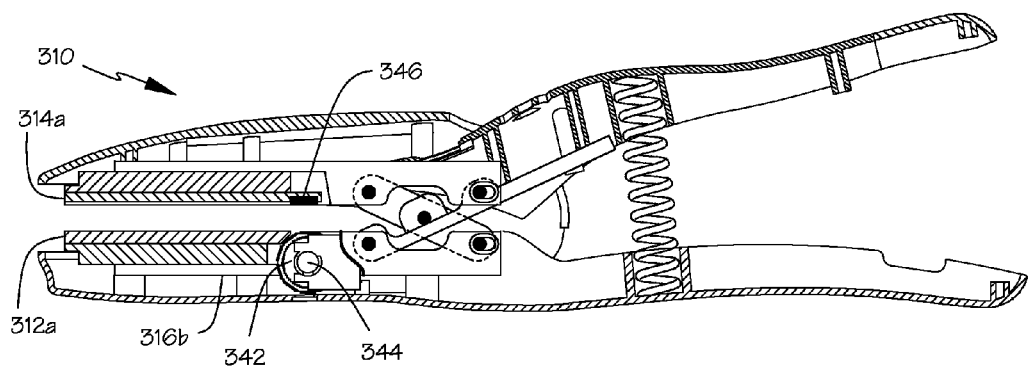
FIG. 8 is a side view of still another tool that embodies the invention in open position with the covers drawn in section view.

FIG. 8 shows another embodiment of a tool 310 in which the first embossing die includes a changeable indicia 342. The changeable indicia 342 may be in the form of one or more rotatable discs having raised figures on the edge of the disc. The rotatable discs may be supported by a heated axle 344. The second embossing die 314*b* may include a resilient pad portion 346 opposite the changeable indicia 342.

Figure 9A:
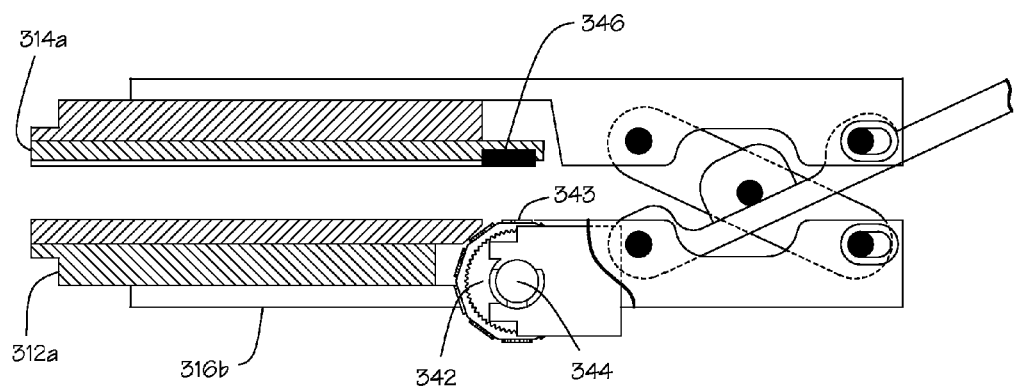
FIGS. 9A and 9B are close-up views of a portion of the tool of FIG. 8 in open and closed positions.
Figure 9B:
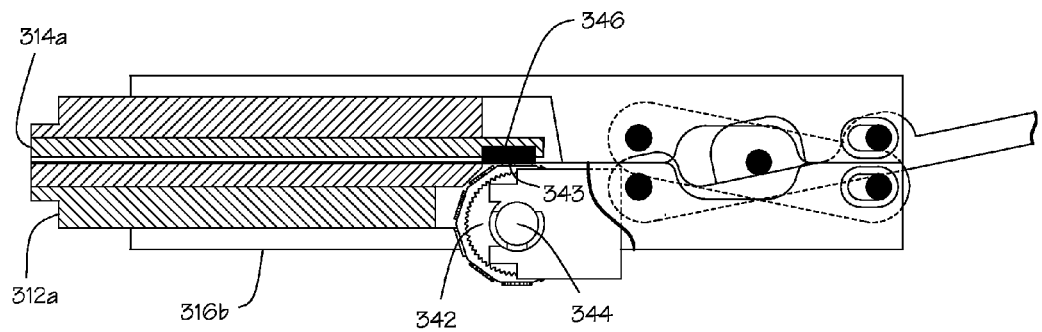

FIGS. 9A and 9B show a detail of a portion of the tool 310 of FIG. 8 in which the operation of the changeable indicia 342 in cooperation with the resilient pad 346 may be more easily seen. Part of the supporting portion 316*b* of the first embossing die has been cut away to show the changeable indicia 342 more clearly. As seen in FIG. 9B, the raised FIG. 343 on the changeable indicia 342 and the resilient pad 346 are pressed together when the tool 310 is closed. This will cause the resilient pad 346 to press a sheet material placed between the embossing dies 312*a*, 314*a* to be formed over the raised FIG. 343 on the changeable indicia 342. This may be used to provide identifying information, such as a packaging date, location, or content, in the sheet material being embossed.

Figure 10:
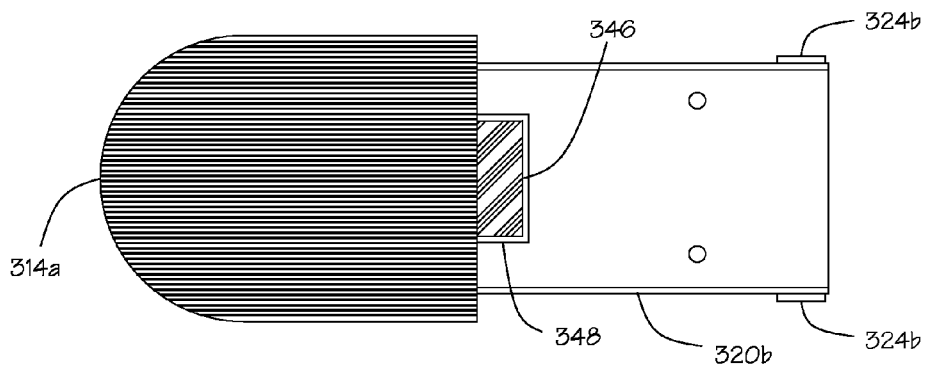
FIG. 10 is a plan view of a portion of the tool of FIG. 8.

FIG. 10 is a plan view of the second embossing die 314*a* illustrating how the die may be supported by the portion 320*b* that includes the slot 324*b* of the coupling points. The resilient pad 346 may be supported by a tab 348 that extends from an end of the second embossing die 314*a*. The resilient pad 346 may be made of a heat resistant resilient material, such as silicon rubber, if the changeable indicia 342 are heated.

Figure 11:
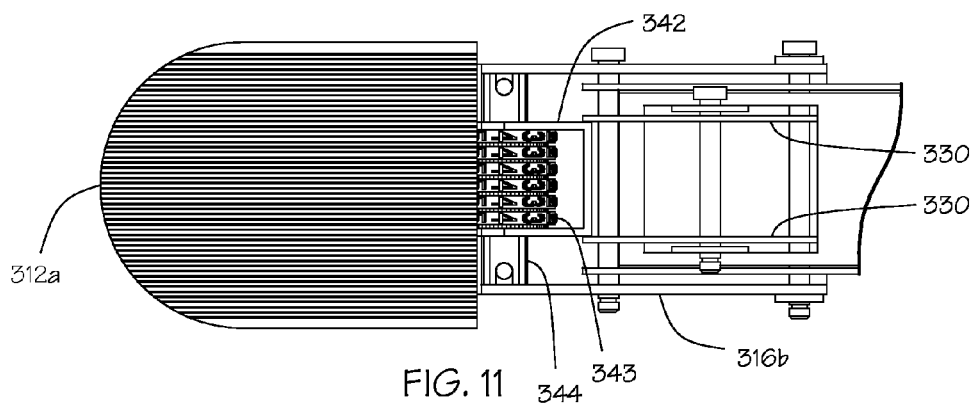
FIG. 11 is a plan view of another portion of the tool of FIG. 8.

FIG. 11 is a plan view of the first embossing die 312*a* illustrating how the die may be supported by the portion 316*b* that is coupled to the first handle and the links 330. The relationship of the changeable indicia 342 and the patterned surface of the first embossing dies 312a for this embodiment may be seen.

The tool 310 may be used to emboss a plastic bag that may be formed from two panels of substantially rectangular plastic film. The plastic film may include an oxygen barrier and a heat sealable surface. The panels may be joined along three edges with the heat sealable surfaces facing one another. The tool may be used to emboss a pattern of air channels at or near an unsealed edge of one of the panels of the plastic bag. The pattern may be embossed in the plastic panel before some or all of the edges are joined. The pattern of air channels may extend less than halfway into the bag and less than across the width of the bag. Preferably the pattern is concentrated approximately in the middle of the width. Thus a large majority of the surfaces of the bag are left flat so that they can be drawn tightly against the surfaces of the item being packaged to minimize residual volume.

The pattern of air channels provide an area where the plastic film has been deformed, by pressure and possibly heat, to form a number of air channels. The pattern of air channels form a corrugated or pleated section in the bag where the peaks of the air channel are resistant to the pressures that tend to flatten the air channels. It is desirable that the air channels be spaced relatively close together in relation to the depth of the air channels since this makes the channels more resistant to crushing by the pressure differential created during evacuation of the bag.

At the second, inner end of the air channel there is a transition from the patterned area that is held open by the corrugations of the air channels to the flat area that remains flexible and capable of being drawn tightly against a surface including the opposite panel. There is a tendency of the flat panels to be drawn together and pinch shut the second end of the air channels as the bag is evacuated. It has been discovered that this tendency toward pinching shut can be counteracted by arranging the second ends of the air channels such that the second ends do not form a straight line.

Figure 12:
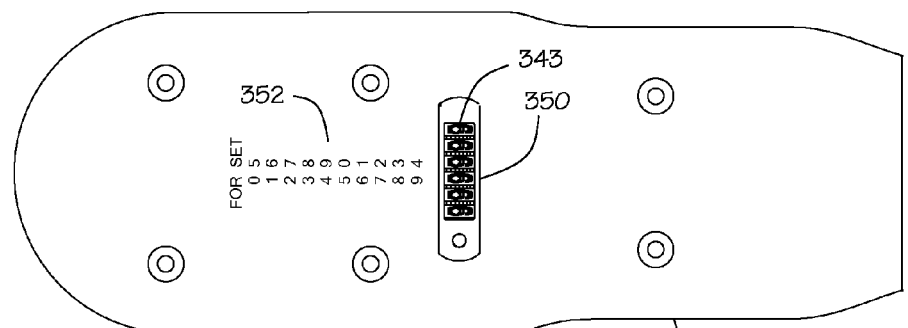
FIG. 12 is a plan view of a third portion of the tool of FIG. 8.

FIG. 12 is a plan view of the bottom surface of the cover 316a for the first embossing die 312a. An opening 350 may be provided in the bottom surface of the cover 316a to allow setting of the changeable indicia 342. The raised FIG. 343 on the changeable indicia 342 may be "right reading" rather than being mirror images as is conventionally found on marking devices. This can be done because the indicia are embossed into the sheet material allowing the applied markings to be read from the side of the material opposite the side contacted by the indicia. This may ease setting of the indicia since the operator will view the indicia in the same orientation as it is read on the marked material. Since the viewable FIG. 343 differ from the figures that will be marking, a chart 352 may be provided adjacent the opening 350 to show what figures should be set based on the desired marking.

Figure 13:
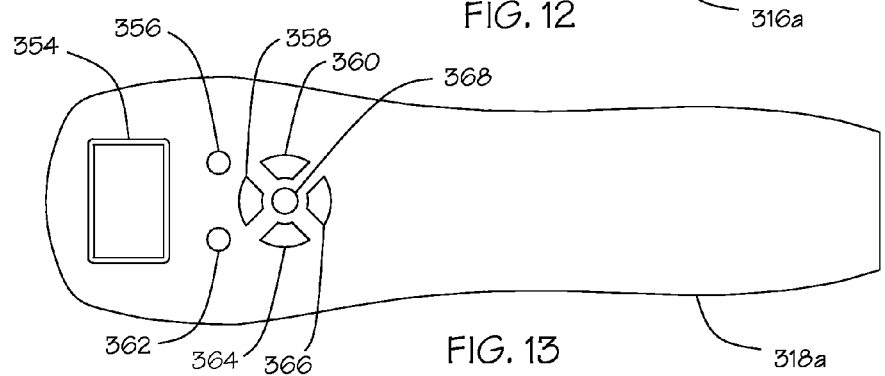
FIG. 13 is a plan view of a third portion of the tool of FIG. 8.

FIG. 13 is a plan view of the upper surface of the second handle 318a. One or both of the first embossing die and the second embossing die may include a heating element, such as an electric resistance heater powered by an attached electrical cord, to heat the dies and allow certain materials to be more readily embossed. A temperature controller may be coupled to the heating element. The temperature controller may provide a selectable temperature set point to accommodate a variety of materials to be embossed. FIG. 13 shows an embodiment of the controls for the temperature controller. The controls may include temperature set point increase 358 and decrease 366 pushbutton switches. The controls may also include a display 354 that shows the set temperature and an indicator lamp 356 to show when the temperature is at the set point.

The controls may also include a dwell timer. The controls may include dwell time increase 360 and decrease 364 pushbutton switches. The dwell timer may be started when the dies are closed against each other and provide an indicator lamp 362 to show when the set dwell time has elapsed. The controls may include a power switch 368.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An embossing hand tool comprising:
    a first handle including a first embossing die;
    a second embossing die;
    a second handle coupled to the first handle and to the second embossing die with one of the couplings being a pivotal coupling and the other coupling being a sliding coupling;
    a link coupled to the first handle and to the second embossing die with one of the couplings being a pivotal coupling and the other coupling being a sliding coupling, and coupled to the throughout their range of motion; and
    a heating element coupled to at least one of the first embossing die and the second embossing die couplings such that the first embossing die and the second embossing die remain substantially parallel throughout their range of motion.

2. The embossing hand tool of claim 1 further comprising a changeable indicia coupled to the first embossing die and a resilient pad coupled to the second embossing die opposite the changeable indicia.

3. The embossing hand tool of claim 2 wherein the changeable indicia are rotatably coupled to the first embossing die by an axle that includes a heating element.

4. The embossing hand tool of claim 2 wherein the changeable indicia are right reading.

5. The embossing hand tool of claim 1 wherein the sliding coupling includes a pin that engages a slotted opening having a length that limits a maximum distance between the first embossing die and the second embossing die to be just sufficient to receive a sheet of material for embossing.

6. The embossing hand tool of claim 5 further comprising a compression member coupled between the first handle and the second handle for biasing the first embossing die and the second embossing die to the maximum distance between them.

7. The embossing hand tool of claim 1 wherein the first handle can be operatively supported by a flat surface.

8. The embossing hand tool of claim 1 further including a temperature controller coupled to the heating element.

9. An embossing hand tool comprising:
    a first embossing means for providing a support on a flat surface;
    a second embossing means for embossing a material against the first embossing means;
    a handle means coupled to the first embossing means and to the second embossing means for closing the second embossing means against the first embossing means; means substantially parallel throughout their range of motion; and heating means for heating at least one of the first embossing means and the second embossing means embossing means, and to the handle means for holding the first embossing means and the second embossing means substantially parallel throughout their range of motion.

10. The embossing hand tool of claim 9 further comprising an indicia means coupled to the first embossing means for embossing a mark in the material and a pad means coupled to the second embossing means for pressing against the indicia means.

11. The embossing hand tool of claim 10 wherein the indicia means further comprises a rotatable element for selectably providing the mark and an axle means for rotatably supporting and for heating the rotatable element.

12. The embossing hand tool of claim 10 wherein the changeable indicia are right reading.

13. The embossing hand tool of claim 9 further comprising a slot means for limiting a maximum distance between the first embossing means and the second embossing means to be just sufficient to receive a sheet of material for embossing.

14. The embossing hand tool of claim 13 further comprising a compression means for biasing the first embossing means and the second embossing means to the maximum distance between them.

15. The embossing hand tool of claim 9 further comprising a controller means for controlling a temperature of the heating means.

16. An embossing hand tool comprising:
   a first handle including a first embossing die and a changeable indicia rotatably supported by an axle that includes a heating element;
   a second embossing die including a resilient pad opposite the changeable indicia;
   a second handle coupled to the first handle and to the second embossing die with one of the couplings being a pivotal coupling and the other coupling being a sliding coupling; and
   a link coupled to the first handle and to the second embossing die with one of the couplings being a pivotal coupling and the throughout their range of motion; and a heating element coupled to at least one of the first embossing die and the second embossing die second handle at a pivot point equidistant from the other couplings such that the first embossing die and the second embossing die remain substantially parallel throughout their range of motion.

17. The embossing hand tool of claim 16 wherein the changeable indicia are right reading.

18. The embossing hand tool of claim 16 wherein the sliding coupling includes a pin that engages a slotted opening having a length that limits a maximum distance between the first embossing die and the second embossing die to be just sufficient to receive a sheet of material for embossing.

19. The embossing hand tool of claim 18 further comprising a compression member coupled between the first handle and the second handle for biasing the first embossing die and the second embossing die to a maximum distance between them.

* * * * *